United States Patent
Douglas

(10) Patent No.: US 11,124,095 B2
(45) Date of Patent: Sep. 21, 2021

(54) CAR SEAT HARNESS REMOVAL SYSTEM

(71) Applicant: Evenflo Company, Inc., Miamisburg, OH (US)

(72) Inventor: Jeffrey Douglas, Charlotte, NC (US)

(73) Assignee: Evenflo Company, Inc., Miamisburg, OH (US)

(*) Notice: Subject to any disclaimer, the term of this patent is extended or adjusted under 35 U.S.C. 154(b) by 0 days.

(21) Appl. No.: 16/585,560

(22) Filed: Sep. 27, 2019

(65) Prior Publication Data

US 2021/0094446 A1    Apr. 1, 2021

(51) Int. Cl.
  *B60N 2/28* (2006.01)
  *B60N 2/005* (2006.01)
(52) U.S. Cl.
  CPC ............ *B60N 2/28* (2013.01); *B60N 2/005* (2013.01)
(58) Field of Classification Search
  CPC ...... B60N 2/28; B60N 2/2803; B60N 2/2812; B60N 2/005
  USPC .......................................... 297/256.15, 250.1
  See application file for complete search history.

(56) References Cited

U.S. PATENT DOCUMENTS

| | | | |
|---|---|---|---|
| 6,543,847 B2 | 4/2003 | Balensiefer | |
| 6,588,849 B2 | 7/2003 | Glover et al. | |
| 6,779,843 B2* | 8/2004 | Kain | B60N 2/2812 297/250.1 |
| 7,387,336 B2* | 6/2008 | Sakumoto | B60N 2/2812 297/250.1 |
| 8,056,975 B2 | 11/2011 | Longenecker et al. | |
| 8,864,166 B2 | 10/2014 | Longenecker et al. | |
| 8,955,915 B2 | 2/2015 | Mason et al. | |
| 8,991,867 B2 | 3/2015 | Longenecker et al. | |
| 9,403,449 B2 | 8/2016 | Longenecker et al. | |
| 2002/0195867 A1* | 12/2002 | Barger | B60N 2/2812 297/484 |
| 2008/0073957 A1* | 3/2008 | Mostert | B60N 2/2812 297/250.1 |
| 2008/0201923 A1* | 8/2008 | Barger | B60N 2/2812 24/69 ST |
| 2012/0019034 A1* | 1/2012 | Young | A47D 15/006 297/256.15 |
| 2016/0029812 A1* | 2/2016 | Terhune | A47D 1/006 297/153 |
| 2019/0092193 A1* | 3/2019 | Houin | B60N 2/2821 |
| 2020/0079250 A1* | 3/2020 | Harmes V | B60N 2/2821 |

* cited by examiner

*Primary Examiner* — Mark R Wendell
(74) *Attorney, Agent, or Firm* — BakerHostetler

(57) ABSTRACT

A harness locking mechanism for use with a child restraint seat is configurable between a locked state in which a harness cannot be removed from the seat and an unlocked seat in which the harness can be removed from the seat for cleaning or replacement.

18 Claims, 8 Drawing Sheets

CAR SEAT HARNESS REMOVAL SYSTEM

TECHNICAL FIELD

The present disclosure relates generally to seats for use by children in motor vehicles and, more particularly, to seats having child-restraining harnesses. More particularly, the present invention relates to children's vehicle seats with removable harnesses and, in particular, to systems and methods for quickly and effectively removing and replacing such harnesses.

BACKGROUND

Child seats are widely used by operators of motor vehicles. Child seats generally include a plastic shell with a cushioned seat formed over the shell. A harness is generally provided on the seat to restrain the child and retain the child in the seat. Harness systems typically include a shoulder harness with straps designed to extend over the shoulders of the child, a lower belt, and a buckle.

During use, the belts or straps of the harness system can become worn or dirty. However, with conventional car seats, removal and replacement of the harness belt is not possible without specialized tools or destruction of the seat.

In short, prior art devices do not provide the important advantages of allowing easy and quick removal and replacement of the harness system, namely without the need to use specialized tools. Thus, it may be desirable to provide systems and methods for quickly and effectively removing and replacing the harness system of a car seat, namely through the operation of an easy-to-use and conveniently-located latching or locking mechanism.

SUMMARY

According to the present disclosure, a child restraint seat is provided having a harness locking mechanism.

In a first aspect, a child restraint seat may include a seat shell having a front surface and a rear surface, the rear surface including a longitudinal groove therein; a flexible retention tab located in the rear surface of the seat shell and forming a border of the longitudinal groove; and a harness locking mechanism configurable between (a) a locked state in which the harness locking mechanism abuts the retention tab, and (b) an unlocked state in which, upon deflection of the retention tab away from the longitudinal groove, the harness locking mechanism slides axially along the longitudinal groove past the retention tab.

In some embodiments, the harness locking mechanism may include a locking pin, a locking tab, and an anchor member. The locking tab may be connected to a distal end of the locking pin. The locking pin may engage with the anchor member by passing through a hole in the anchor member. The anchor member may include an anchor rod affixed to a seat frame tube. In such embodiments, the locking pin may engage with each of the anchor rod and the seat frame tube by passing through a hole in each of the anchor rod and the seat frame tube.

In particular configurations, when the retention tab is in the locked state, the locking pin engages the anchor member and the locking tab abuts the retention tab, thereby preventing the harness locking mechanism from sliding axially along the longitudinal groove.

In embodiments, when the retention tab is I the unlocked state upon deflection of the retention tab away from the longitudinal groove, the locking pin disengages from the anchor member and slides axially along the longitudinal groove with at least the locking tab sliding past a distal end of the retention tab.

The retention tab and the locking tab can each be made of plastic. The locking pin and the anchor member can each me made of metal.

In some embodiments, the rear surface of the seat shell may further include a raised projection located proximate the retention tab. The raised projection may be configured to limit the extent of deflection of the retention tab away from the longitudinal groove.

In another aspect, a child restraint seat may include a seat shell having a front surface and a rear surface; a harness locking mechanism including a locking pin and an anchor member; and a flexible retention tab located in the rear surface of the seat shell, the retention tab configurable between (a) a locked state in which the locking pin engages the anchor member, and (b) an unlocked state in which, upon deflection of the retention tab, the locking pin disengages from the anchor member.

In yet another aspect, a method of removing a harness from a child restraint seat may include providing a child restraint seat including (a) a seat shell having a front surface and a rear surface, the rear surface including a flexible retention tab located therein, (b) a harness, and (c) a harness locking mechanism including a locking pin, a locking tab connected to a distal end of the locking pin, and an anchor member; applying a force to the retention tab to deflect the retention tab; sliding the locking tab past the deflected retention tab, such that the locking pin disengages from the anchor member; and pulling the harness from the rear surface of the seat shell therethrough and removing the harness.

In some embodiments, the applying step may further include applying a force to deflect the retention tab away from a longitudinal groove in the rear surface of the seat shell. A border of the longitudinal groove may be formed by the retention tab.

In particular configurations, the sliding step may further include sliding the locking tab axially along the longitudinal groove past the deflected retention tab, such that the locking pin disengages from the anchor member and slides axially along the longitudinal groove with at least the locking tab sliding past a distal end of the retention tab.

In some embodiments, the method may further include feeding a new harness from the rear surface of the seat shell therethrough; and sliding the locking tab back past the retention tab, such that the locking pin reengages the anchor member.

These and other features and advantages of the present disclosure will become apparent to those skilled in the art upon consideration of the following detailed description of preferred embodiments exemplifying the best mode of carrying out the present disclosure as presently perceived. The drawings are only to serve for reference and illustrative purposes, and are not intended to limit the scope of the invention.

BRIEF DESCRIPTION OF THE DRAWINGS

The detailed description particularly refers to the accompanying figures in which.

DETAILED DESCRIPTION

Figure 1:
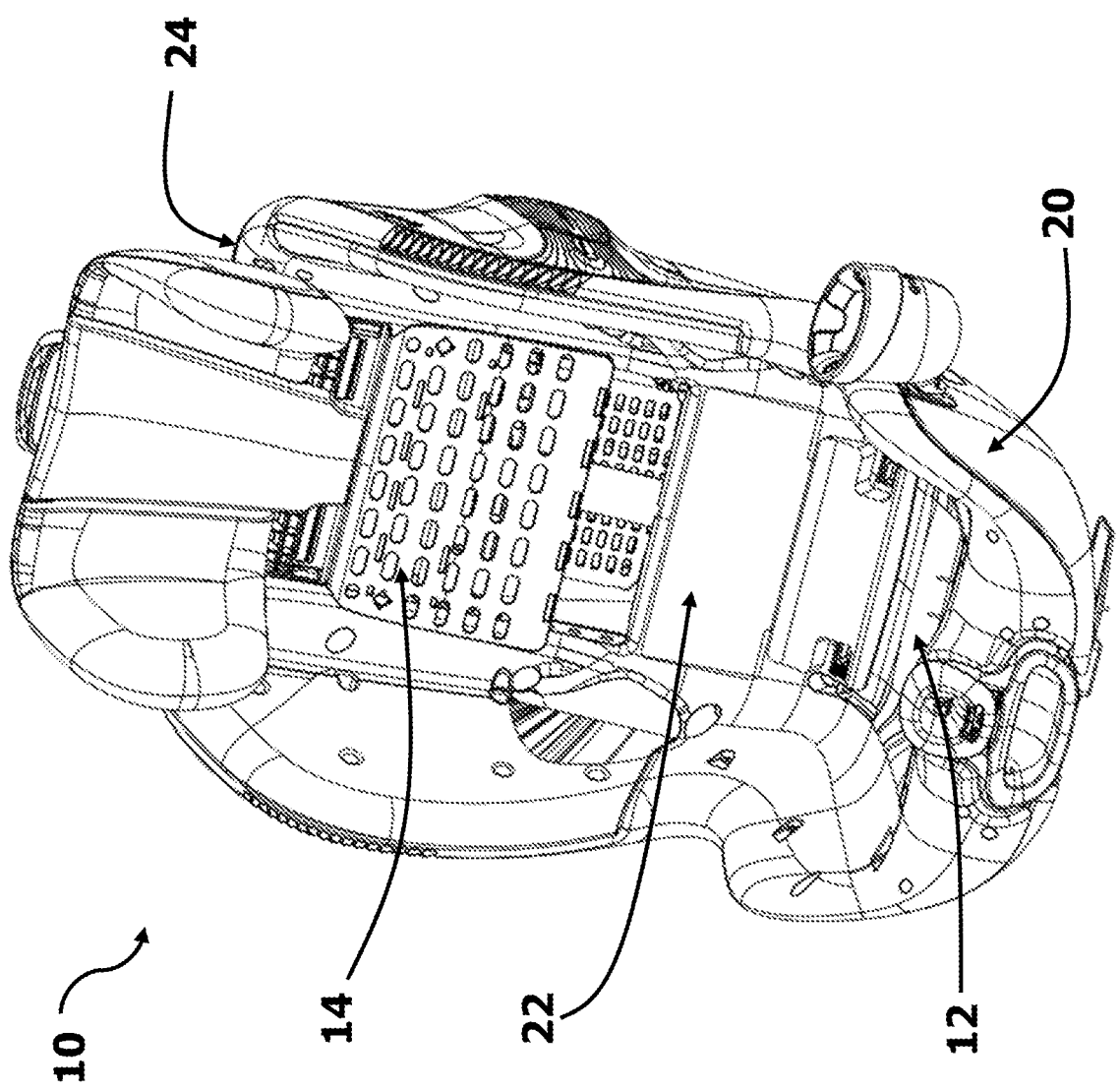
FIG. 1 is an isometric view of an exemplary embodiment of a child restraint seat according to the present disclosure.

While an embodiment of a child restraint seat is provided herein that includes a harness locking mechanism that is configurable between a locked and an unlocked state to facilitate removal of an associated harness, there is shown in the drawings and will herein be described in detail one or more embodiments of such a harness locking mechanism, either employed alone or as a component of a child restraint, with the understanding that this disclosure is to be considered an exemplification of the principles disclosed herein and is not intended to be limited to merely the illustrated and discussed embodiments Referring to FIG. 1, an exemplary child restrain seat 10 is shown. The child restraint seat 10 may generally be comprised of a variety of known components, such as a seat shell 20. The seat shell 20 may, in embodiments, be generally defined by a seating portion 12 and a back rest portion 14. The seat shell 20 includes a front surface 22 (shown in FIG. 1) and an opposing rear surface 24.

Figure 2:
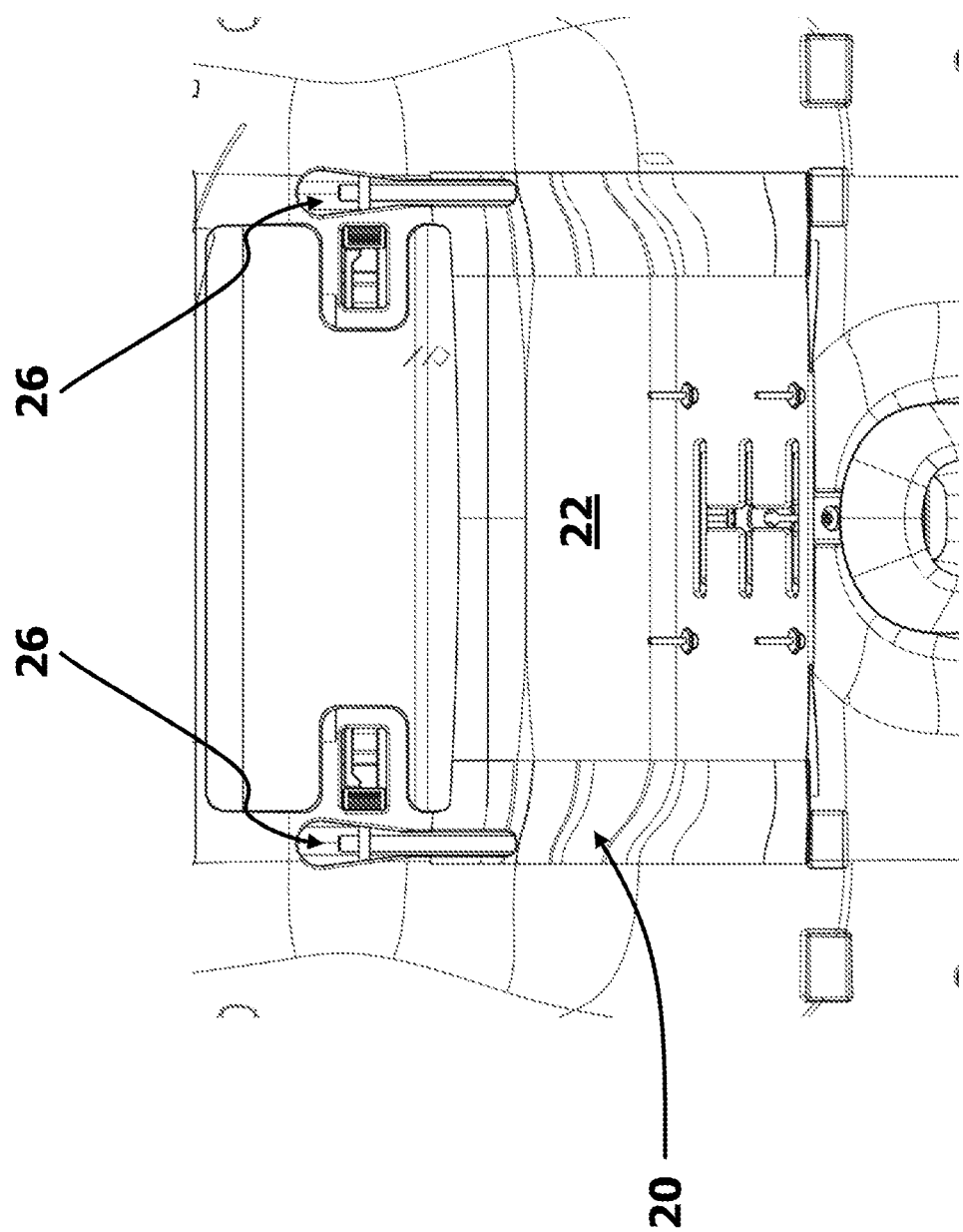
FIG. 2 is a partial view of the front surface of the child restraint of FIG. 1.

As can be seen with reference to FIG. 2, slots 26 can be formed in the seat shell 20 for the passage of a harness (not shown) therethrough. In particular, in embodiments, the harness can be fed through the slots in the seat shell so as to pass the harness from the rear surface 24 to the front surface 22 of the seat shell 20.

Figure 3:
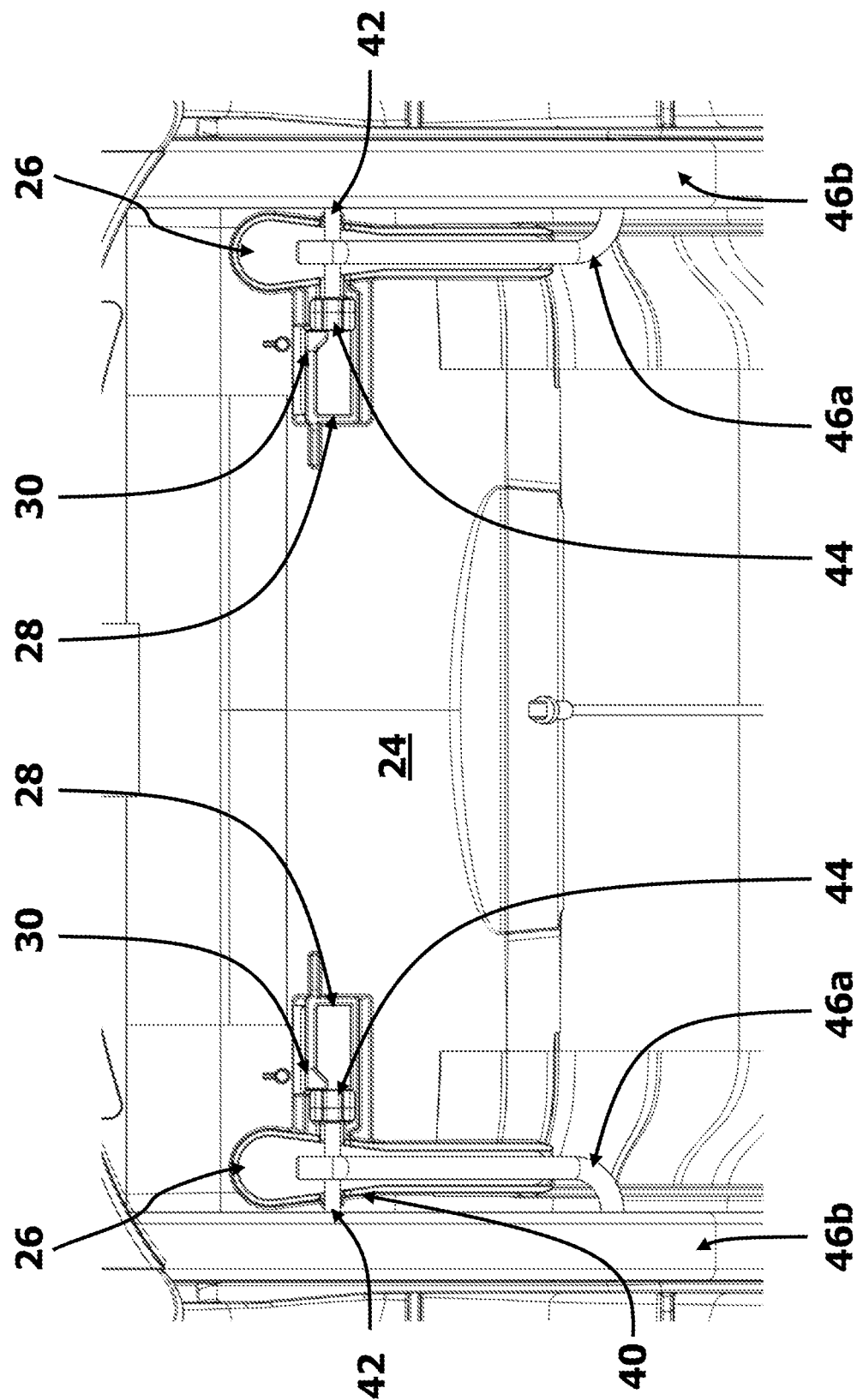
FIG. 3 is a partial view of the rear surface of the child restraint of FIG. 1.

Turning to FIG. 3, the rear surface 24 of the seat shell 20 can be seen. In the rear surface 24 of the seat shell 20, one or more longitudinal slots or grooves 28 can be formed. As used herein, the term "groove" is intended to encompass those structures capable of receiving a corresponding component for guided movement therein or therethrough. As shown with reference to FIGS. 3-5, the longitudinal groove 28 may be defined by a plurality of walls extending outwardly away from the rear surface 24 of the seat shell 20, with the walls generally enclosing or surrounding a narrow opening (e.g., that passes from the front surface to the rear surface of the seat shell), thereby defining the longitudinal groove 28. As will be readily appreciated by those skilled in the art, the longitudinal groove 28 may extend from the front surface to the rear surface of the seat shell, but could also be formed such that the longitudinal groove 28 does not extend completely through the seat shell to the front surface. In certain embodiments, the longitudinal groove can be formed in the rear surface of the seat shell or, alternatively, can be formed from one or more parts separate from the seat shell.

Figure 4:
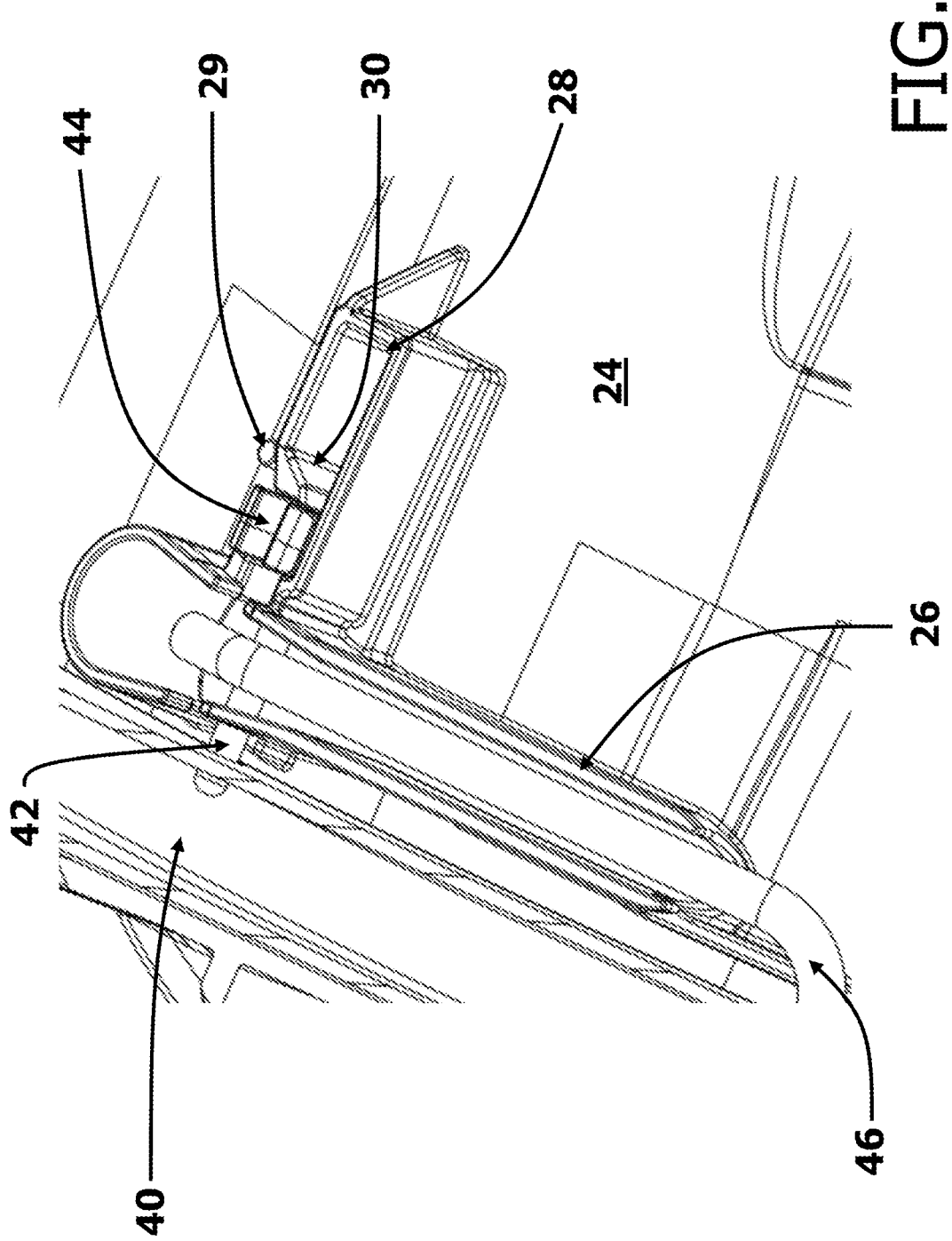
FIG. 4 is a detailed view of the harness locking mechanism of the child restraint seat of FIG. 1, with the harness locking mechanism and retention tab in the locked state.
Figure 5:
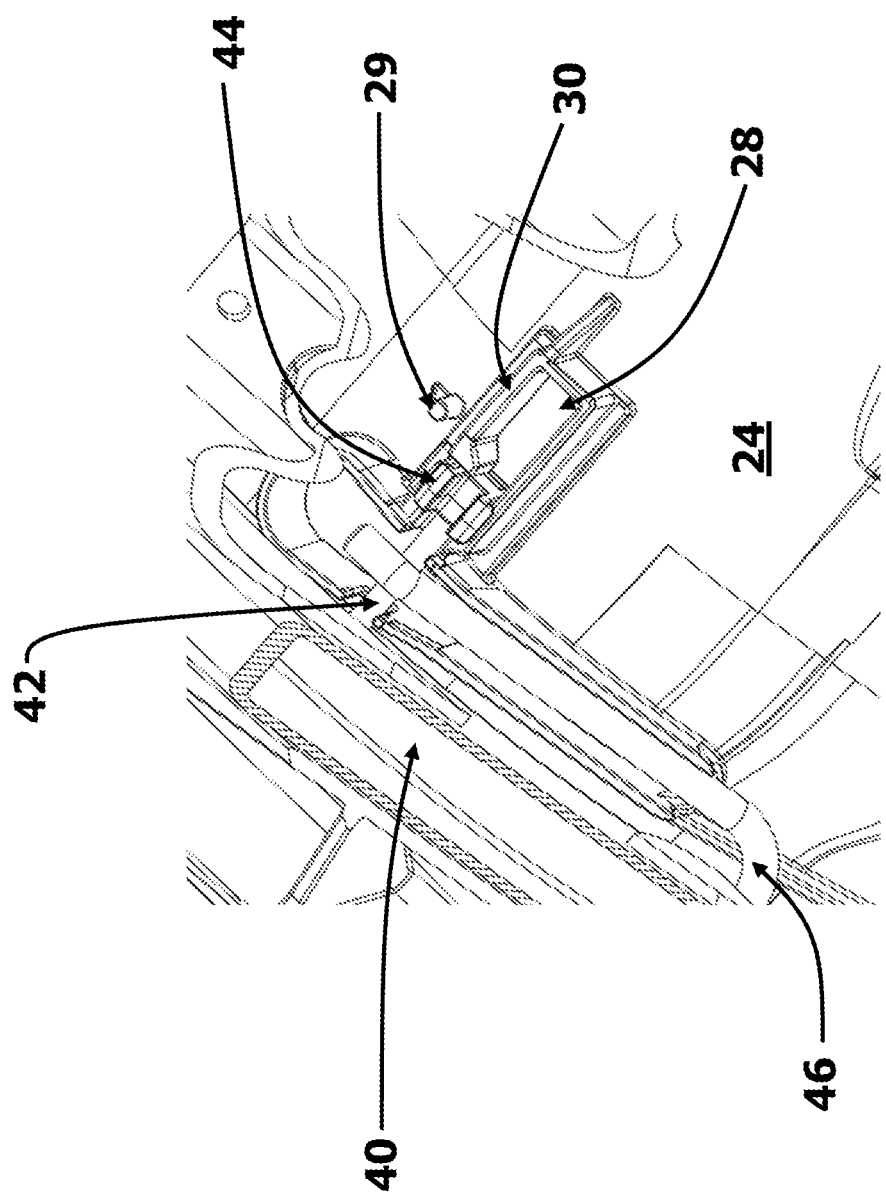
FIG. 5 is another detailed view of the harness locking mechanism of the child restraint seat of FIG. 1 according to the present disclosure, with the harness locking mechanism and retention tab in the locked state.

With continued reference to FIGS. 3-5, a retention tab 30 may form a border of (e.g., one of the walls surrounding) the longitudinal groove 28. The retention tab 30 is generally formed of any suitably flexible, and preferably at least semi-elastic, material capable of withstanding repeated deflection without undue stress or breakage. In particular embodiments, the retention tab 28 can be made of a plastic. The retention tab 30 is configured for deflection away from the longitudinal groove 28 (i.e., away from the interior of the longitudinal groove). In this way, the retention tab 30 may be deflected from an unlocked or non-deflected state (i.e., when no force is applied to the retention tab) to an unlocked deflected state (i.e., when sufficient force is applied to the retention tab). It is desired that deflection of the retention tab 30 can be accomplished by applying a small force (e.g., by a finger) to the retention tab 30 in a direction away from the longitudinal groove 28. It is further desired that the deflection tab 30 is in the locked state by default (i.e., when no force is applied) and that sufficient force is required to deflect the retention tab to the unlocked state. Similarly, it is desired that the retention tab is sufficiently flexible to automatically return to the locked or non-deflected state when the deflecting force is no longer applied thereto. In certain embodiments, the retention tab can be formed in the rear surface of the seat shell or, alternatively, can be formed from one or more parts separate from the seat shell.

In certain embodiments, the retention tab 30 may, at its distal end, extend into the interior of the longitudinal groove 28 when in the locked state. In this way, when the retention tab 30 is in the locked or non-deflected state, the retention tab 30 may, at least partially, act as a barrier preventing passage of any other components axially along the longitudinal groove 28, as will be explained in greater detail herein. The size and shape of the distal end of the retention tab 30 may be selected depending on the specifics of the particular application (e.g., the size of the longitudinal groove, the size of corresponding components of the harness locking mechanism), as will be readily appreciated by those skilled in the art. As shown in FIGS. 3-5, the distal end of the retention tab 30 may be generally triangular-shaped, so as to provide a flat surface against which adjacent components may abut when the retention tab 30 is in the locked or non-deflected state (thereby preventing such adjacent components from sliding axially along the longitudinal groove past the retention tab).

A harness locking mechanism 40 is also provided for facilitating the removal and replacement of the harness in the child restraint seat. Similar to the retention tab, the harness locking mechanism 40 is configurable between a locked state and an unlocked state. In the locked state (as shown in FIGS. 3-5), the harness locking mechanism 40 generally prevents the removal of the harness (not shown) from the child restraint seat. Conversely, when the harness locking mechanism is in the unlocked state, the harness locking mechanism generally facilitates the removal of the harness and the insertion of a new harness.

The harness locking mechanism 40 includes a locking pin 42, a locking tab 44 (e.g., made of plastic) connected to a distal end of the locking pin 42, and an anchor member 46. The locking pin 42 is, in embodiments, is a rigid pin (e.g., made of metal) that is connected to the locking tab 44 (e.g., at its distal end and engages with the anchor member 46 at its opposite end. The locking pin 42 may, in embodiments, engage with the anchor member 46 by passing through a hole in the anchor member 46. For example, as shown in FIG. 3, the locking pin 42 passes through aligned holes in each of the anchor rod 46a and seat frame tube 46b of the anchor member 46. In this way, the locking pin 42 may selectively engage and disengage from the anchor member 46.

In the locked state (as shown in FIGS. 3-5), the locking pin 42 engages the anchor member 46 (i.e., the anchor rod 46a and seat tube frame 46b) and the locking tab 44 abuts the retention tab 30. In this way, the harness locking mechanism 40 is prevented from sliding axially along the longitudinal groove 30 when in the locked state.

Upon deflection of the retention tab 30 away from the longitudinal groove 28, thereby placing the retention tab in the unlocked state, the harness locking mechanism 40 can be slid axially along the longitudinal groove 28. In particular, by applying force to the locking tab 44 and causing it to slide past the retention tab 30, the locking pin 42 connected thereto is caused to slide out of engagement with the anchor member 46 (i.e., seat tube frame 46b and the anchor rod 46a, in respective succession) and axially along the longitudinal groove 28. As shown, the locking pin 42 generally has a length that is substantially equal to or less than the length of the longitudinal groove 28. In particular, the locking pin 42 may be sized such that once the locking tab 44 at the distal end of the locking pin 42 is slid past the distal end of the retention tab 30, the opposite end of the locking pin 42 becomes disengaged with the anchor member 46. As will be readily appreciated by those skilled in the art, the locking pin 42 and anchor member 46 may be of any desired size or shape suitable to provide sufficient strength to retain the harness locking mechanism 40 in the locked state until a sufficient force is applied to slide the harness locking mechanism 40 axially along the longitudinal groove 28 past the deflected retention tab 30. Moreover, the triangular-shaped distal end of the retention tab 30 may be oriented such that the angled side of the distal end faces the locking tab 44 when the harness locking mechanism 40 is in the unlocked stated, such that when the harness locking mechanism 40 is returned to the locked state (i.e., by sliding the locking tab 44 past the retention tab 30, such that the locking pin 42 reengages the anchor member 46), the locking tab 44 may automatically deflect the retention tab 30 away from the longitudinal groove 28 (i.e., without the need to apply an external force to the retention tab due to the angled nature of retention tab).

As best seen in FIG. 3, anchor member 46 may be formed by an anchor rod 46a (e.g., a rigid tube made of metal) affixed along its lower end to a seat tube frame 46b (e.g., a rigid metal structure). The anchor member 46 holds the harness (not shown in FIG. 3) in place for all standard uses, though the harness generally undergoes no motion relative to the anchor member 46 during standard use. During installation and removal of the harness, as will be described in more detail herein, the anchor member 46 and the slots 26 formed in the seat shell 20 serve as a guide to assist in directing the harness to the appropriate location. The anchor rod 46a is generally affixed to the seat tube frame 46b (e.g., by welding) in such a way that neither the anchor rod 46a nor seat tube frame 46b moves as the locking pin 42 is slid into and out of engagement therewith. In this way, the holes in each of the anchor rod 46a and seat tube frame 46b may be aligned with one another and sized to receive the locking pin 42 for passage therethrough. As will be readily appreciated by those skilled in the art, the anchor member 46 could be formed by various other structures with which the locking pin 42 could engage. By way of non-limiting example, the anchor member 42 could be a hole or indentation in the seat shell.

As previously described, the locking pin 42 and connected locking tab 44 are generally sized so as to be capable of sliding axially along the longitudinal groove 28 with relatively little force being applied to the locking tab 44. As can be best seen in FIG. 5, the locking tab 44 generally has a width or diameter that is greater than a width or diameter of the locking pin 42. More particularly, the locking tab 44 may, in certain embodiments, have an H-shaped cross section. In this way, the locking tab 44 may have a plurality of outwardly-extending "legs" shaped complementary to the walls bordering the longitudinal groove 28, such that the locking tab 44 may "ride" along the walls bordering the longitudinal groove 28 as the locking tab 44 and connected locking pin 42 slide axially along the longitudinal groove 28, with the "legs" likewise preventing the locking tab 44 from becoming disengaged from the walls surrounding the longitudinal groove 28.

As best seen in FIG. 5, the rear surface 24 of the seat shell may, in some embodiments, include a raised projection 29 extending outwardly therefrom. The raised projection 29 may, as shown, be located proximate the retention tab 30. In particular, the raised projection 29 may be located in a path of deflection of the retention tab 30 (i.e., along the path that the retention tab travels when deflected). In this way, the raised projection, may limit the extent of deflection of the retention tab 30 away from the longitudinal groove 28. As a result, the raised projection 29 can effectively increase the life of the retention tab 30 by preventing the retention tab 30 from being deflected too far (i.e., to a point that would damage the flexibility and elasticity of the retention tab).

FIGS. 6A-6F show the harness locking mechanism in use in a child restraint seat including a harness. In particular, FIGS. 6A-6F show one embodiment of a method for removing the harness from the child restraint seat.

Figure 6A:
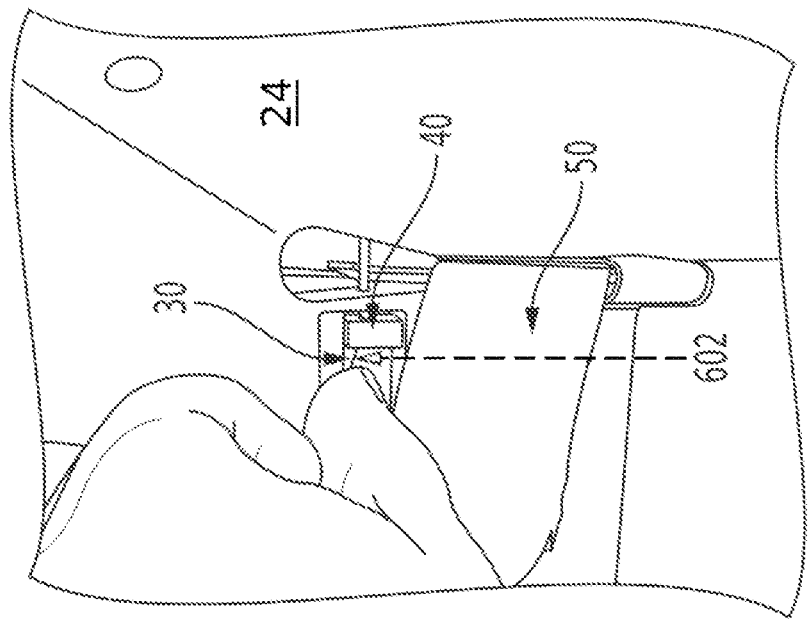
FIG. 6A is a partial view of the rear surface of a child restraint seat including a harness and harness locking mechanism according to the present disclosure, with the harness locking mechanism and retention tab in the locked state.

As shown in FIG. 6A, the harness locking mechanism 40 is in the locked state (i.e., with the locking tab abutting the retention tab) and the retention tab 30 is in the locked or non-deflected state. As a result, the harness 50 is prevented from being removed from the child restraint seat.

Figure 6B:
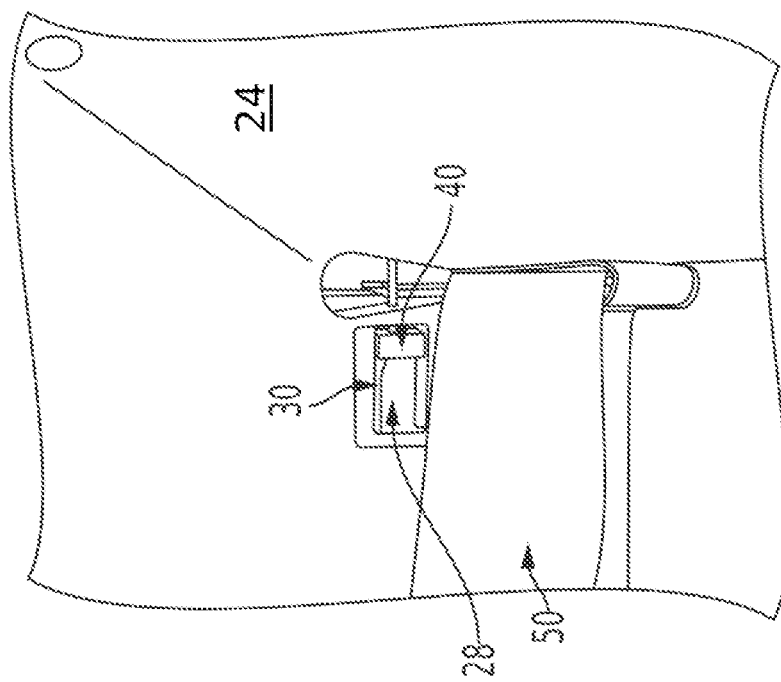
FIG. 6B is a partial view of the rear surface of the child restraint seat of FIG. 6A, with a force being applied to a retention tab to deflect the retention tab to the unlocked state.

In FIG. 6B, a force (i.e., finger pressure) is applied to the retention tab 30 in the direction of arrow 602 to cause the retention tab 30 to be deflected away from the longitudinal groove 28. The retention tab 30 is thus in the unlocked or deflected state.

Figure 6D:
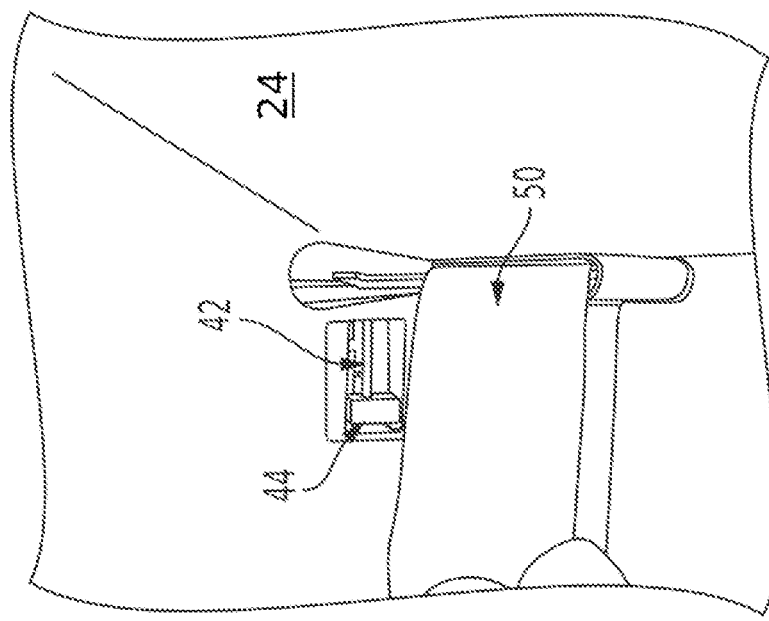
FIG. 6D is a partial view of the rear surface of the child restraint seat of FIG. 6A, with the harness locking mechanism in the unlocked state after being slid past the deflected retention tab.
Figure 6C:
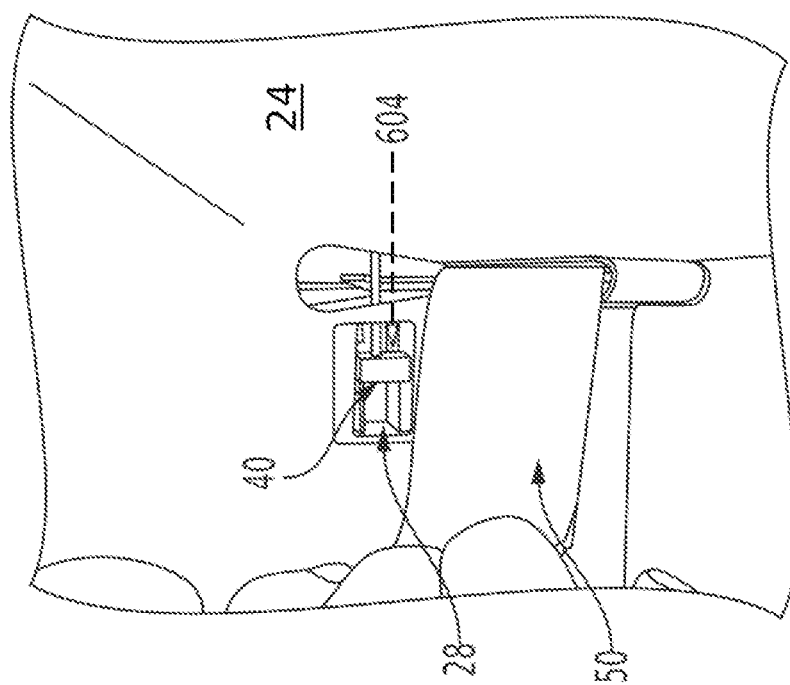
FIG. 6C is a partial view of the rear surface of the child restraint seat of FIG. 6A, with the locking tab and locking pin of the harness locking mechanism being slid past the deflected retention tab.

In FIG. 6C, a force (i.e., finger pressure) has been applied to the harness locking mechanism 40 in the direction of arrow 604 to cause the harness locking mechanism 40 to begin sliding axially along the longitudinal groove 28.

In FIG. 6D, the harness locking mechanism 40 has been caused to slide axially along the full length of the longitudinal groove past the deflected retention tab. In particular, the locking tab 44 can be seen to have slid past the retention tab, thereby causing the locking pin 42 to disengage from the anchor member (not shown). The harness locking mechanism 40 is thus in the unlocked state.

Figure 6F:
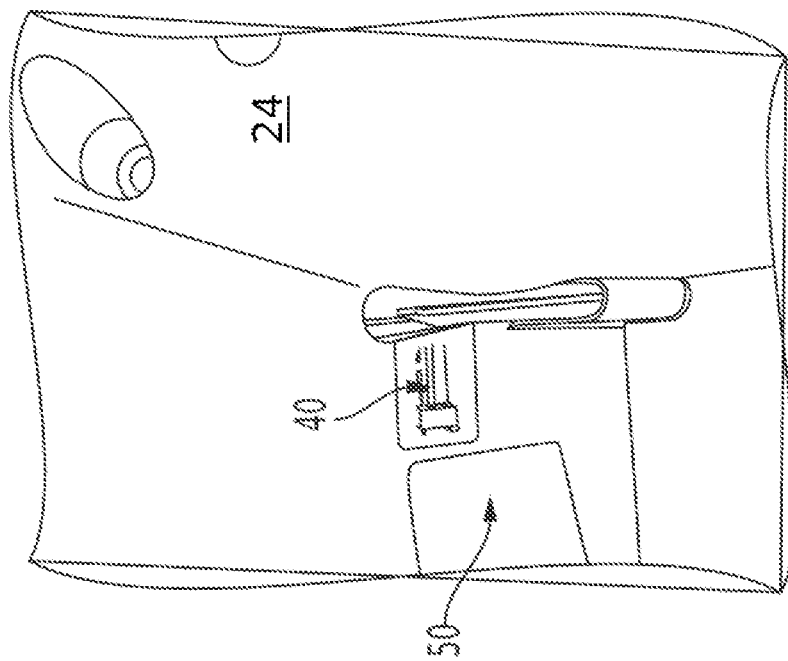
FIG. 6F is a partial view of the rear surface of the child restraint seat of FIG. 6A, with the harness removed.
Figure 6E:
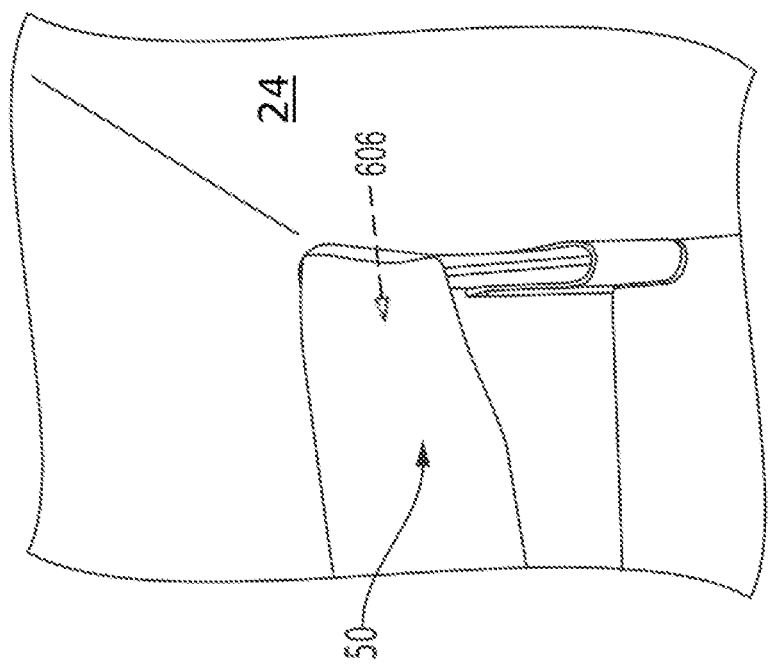
FIG. 6E is a partial view of the rear surface of the child restraint seat of FIG. 6A, with the harness being pulled from the rear surface of the seat shell therethrough for removal therefrom.

In FIG. 6E, a force (i.e., a pulling force) is applied to the harness 50 from the rear of the seat (i.e., from the rear surface 24 of the seat shell) in the direction of arrow 606 to cause the harness 50 to be pulled through the seat shell. As explained above, during removal of the harness 50, the anchor member 46 (i.e., the anchor rod 46a) and the slots 26 formed in the seat shell 20 serve as a guide to assist in directing the harness through the seat shell.

In FIG. 6F, the harness 50 has been removed from the seat shell. The harness locking mechanism 40 remains in the unlocked state so that the harness (or a new harness) can be fed back through the seat shell from the rear of the seat (i.e., from the rear surface 24 of the seat shell). After cleaning or replacement of the harness, for example, the harness may be reinstalled into the seat shell. During installation or reinstallation of the harness 50, the anchor member 46 (i.e., the anchor rod 46a) and the slots 26 formed in the seat shell 20 serve as a guide to assist in directing the harness through the seat shell. After the harness is fed back through the seat shell, the harness locking mechanism 40 may be returned to the locked state (i.e., by sliding the locking tab past the retention tab, such that the locking pin reengages the anchor member), thereby preventing the harness from being removed.

Although a specific harness locking mechanism for use in a child restraint seat has been described herein in accordance with the teachings of the present disclosure, the scope of coverage of this disclosure is not limited thereto. More specifically, following from the above description, it should be readily apparent to those skilled in the art that, while the systems and methods described herein constitute exemplary embodiments of the present disclosure, it is to be understood that the disclosure is not limited to these precise systems and methods and that changes may be made therein without departing from the scope of the disclosure. Accordingly, the appended claims are intended to cover all embodiments which do not depart from the spirit and scope of the present disclosure.

What is claimed is:

1. A child restraint seat, comprising:
   a seat shell having a front surface and a rear surface, the rear surface including a longitudinal groove therein;
   a flexible retention tab located in the rear surface of the seat shell and forming a border of the longitudinal groove; and
   a harness locking mechanism including a locking pin, a locking tab connected to a distal end of the locking pin, and an anchor member, the harness locking mechanism configurable between (a) a locked state in which the locking pin engages the anchor member and the locking tab abuts the retention tab, thereby preventing the harness locking mechanism from sliding axially along the longitudinal groove and (b) an unlocked state in which, upon deflection of the retention tab away from the longitudinal groove, the locking pin slides axially along the longitudinal groove past the retention tab.

2. The child restraint seat of claim 1, wherein, when the retention tab is in the unlocked state upon deflection of the retention tab away from the longitudinal groove, the locking pin disengages from the anchor member and slides axially along the longitudinal groove with at least the locking tab sliding past a distal end of the retention tab.

3. The child restraint seat of claim 1, wherein the retention tab and the locking tab are made of plastic and the locking pin and anchor member are made of metal.

4. The child restraint seat of claim 1, wherein the locking pin engages with the anchor member by passing through a hole in the anchor member.

5. The child restraint seat of claim 1, wherein the anchor member includes an anchor rod affixed to a seat frame tube, the locking pin engaging with each of the anchor rod and the seat frame tube by passing through a hole in each of the anchor rod and the seat frame tube.

6. A child restraint seat, comprising;
   a seat shell having a front surface and a rear surface, the rear surface including a longitudinal groove therein;
   a flexible retention tab located in the rear surface of the seat shell and forming a border of the longitudinal groove;
   a raised projection located on the rear surface proximate the retention tab, the raised projection configured to limit the extent of deflection of the retention tab away from the longitudinal groove; and
   a harness locking mechanism configurable between (a) a locked state in which the harness locking mechanism abuts the retention tab, and (b) an unlocked state in which, upon deflection of the retention tab away from the longitudinal groove, the harness locking mechanism slides axially along the longitudinal groove past the retention tab.

7. A child restraint seat, comprising:
   a seat shell having a front surface and a rear surface;
   a harness locking mechanism including a locking pin and an anchor member; and
   a flexible retention tab located in the rear surface of the seat shell, the retention tab configurable between (a) a locked state in which the locking pin engages the anchor member, and (b) an unlocked state in which, upon deflection of the retention tab, the locking pin disengages from the anchor member.

8. The child restraint seat of claim 7, wherein the harness locking mechanism further includes a locking tab connected to a distal end of the locking pin, the locking tab abutting the retention tab when the retention tab is in the locked state.

9. The child restraint seat of claim 8, wherein the retention tab and the locking tab are made of plastic and the locking pin and anchor member are made of metal.

10. The child restraint seat of claim 7, wherein the rear surface of the seat shell includes a longitudinal groove therein and the retention tab forms a border of the longitudinal groove.

11. The child restraint seat of claim 10, wherein, when the retention tab is in the unlocked stated upon deflection of the retention tab away from the longitudinal groove, the locking pin disengages from the anchor member and slides axially along the longitudinal groove with at least the locking tab sliding past a distal end of the retention tab.

12. The child restraint seat of claim 10, wherein the rear surface of the seat shell further includes a raised projection located proximate the retention tab, the raised projection configured to limit the extent of deflection of the retention tab away from the longitudinal groove.

13. The child restraint seat of claim 7, wherein the locking pin engages with the anchor member by passing through a hole in the anchor member.

14. The child restraint seat of claim 7, wherein the anchor member includes an anchor rod affixed to a seat frame tube, the locking pin engaging with each of the anchor rod and the seat frame tube by passing through a hole in each of the anchor rod and the seat frame tube.

15. A method of removing a harness from a child restraint seat, the method comprising:
   providing a child restraint seat including (a) a seat shell having a front surface and a rear surface, the rear surface including a flexible retention tab located therein, (b) a harness, and (c) a harness locking mechanism including a locking pin, a locking tab connected to a distal end of the locking pin, and an anchor member;

applying a force to the retention tab to deflect the retention tab;

sliding the locking tab past the deflected retention tab, such that the locking pin disengages from the anchor member; and pulling the harness from the rear surface of the seat shell therethrough and removing the harness.

16. The method of claim 15, wherein the applying step further includes applying a force to deflect the retention tab away from a longitudinal groove in the rear surface of the seat shell, wherein a border of the longitudinal groove is formed by the retention tab.

17. The method of claim 16, wherein the sliding step further includes sliding the locking tab axially along the longitudinal groove past the deflected retention tab, such that the locking pin disengages from the anchor member and slides axially along the longitudinal groove with at least the locking tab sliding past a distal end of the retention tab.

18. The method of claim 15, further comprising:

feeding a new harness from the rear surface of the seat shell therethrough; and sliding the locking tab back past the retention tab, such that the locking pin reengages the anchor member.

* * * * *